US010797506B2

(12) United States Patent
Van Boheemen et al.

(10) Patent No.: US 10,797,506 B2
(45) Date of Patent: Oct. 6, 2020

(54) DC TO AC POWER CONVERSION USING A WIRELESS POWER RECEIVER

(71) Applicant: WiTricity Corporation, Watertown, MA (US)

(72) Inventors: Edward Van Boheemen, Munich (DE); Chang-Yu Huang, Auckland (NZ); Michael Le Gallais Kissin, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 316 days.

(21) Appl. No.: 15/946,541

(22) Filed: Apr. 5, 2018

(65) Prior Publication Data

US 2019/0312460 A1 Oct. 10, 2019

(51) Int. Cl.
*H02J 7/02* (2016.01)
*H02J 3/01* (2006.01)
*H02M 7/217* (2006.01)
*B60L 11/18* (2006.01)
*H02J 50/12* (2016.01)
*B60L 53/12* (2019.01)
*H02M 1/14* (2006.01)

(52) U.S. Cl.
CPC .............. *H02J 7/025* (2013.01); *B60L 11/182* (2013.01); *B60L 53/12* (2019.02); *H02J 3/01* (2013.01); *H02J 50/12* (2016.02); *H02M 7/217* (2013.01); *H02M 1/14* (2013.01)

(58) Field of Classification Search
CPC ...................................................... H02J 7/025
USPC ....................................................... 320/108
See application file for complete search history.

(56) References Cited

U.S. PATENT DOCUMENTS

| 2011/0254377 A1 | 10/2011 | Wildmer et al. |
| 2015/0061590 A1 | 3/2015 | Widmer et al. |
| 2016/0016479 A1 | 1/2016 | Khaligh et al. |

(Continued)

FOREIGN PATENT DOCUMENTS

| EP | 2889177 | 7/2015 |
| WO | 2016064725 | 4/2016 |
| WO | 2019194971 | 10/2019 |

OTHER PUBLICATIONS

"International Search Report and Written Opinion", PCT Application No. PCT/US2019/023011, datd Jun. 12, 2019, 13 pages.

*Primary Examiner* — Edward Tso
*Assistant Examiner* — Ahmed H Omar
(74) *Attorney, Agent, or Firm* — Colby Nipper PLLC

(57) ABSTRACT

In certain aspects, methods and systems for converting DC power to AC power by a wireless power receiver are disclosed. Certain aspects provide a wireless power receiver including a resonant circuit. The wireless power receiver includes a first switching circuit coupled to the resonant circuit, the first switching circuit configured to act as an inverter and generate a first signal, based on an output from a battery, at a resonant frequency of the resonant circuit, the first signal having an envelope at a first frequency. The wireless power receiver includes a second switching circuit coupled to the resonant circuit that is configured to bias the second switching circuit at the resonant frequency in response to the first signal, wherein the second switching circuit is configured to act as a rectifier and is configured to extract the envelope to generate a second signal at half of the first frequency.

30 Claims, 7 Drawing Sheets

(56) References Cited

U.S. PATENT DOCUMENTS

| | | |
|---|---|---|
| 2016/0126750 A1 | 5/2016 | Yasuda et al. |
| 2016/0368387 A1 | 12/2016 | Pavlovsky et al. |
| 2017/0072807 A1 | 3/2017 | Matsumoto et al. |
| 2017/0237340 A1* | 8/2017 | Long .................. H02M 1/4241 307/82 |

* cited by examiner

DC TO AC POWER CONVERSION USING A WIRELESS POWER RECEIVER

FIELD

This application is generally related to wireless charging power transfer applications, and specifically to a method and apparatus for converting DC power (e.g., from a battery) to power suitable for output to a grid or AC device using circuitry of a wireless power receiver, such as an electric vehicle charging system.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Wireless power charging systems that are capable of transferring power in free space (e.g., via a wireless field) to be used to charge electric vehicles may eliminate the requirement of cables or other connectors of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device (e.g., a base charging unit (BCU), a base pad, base wireless charging system, or some other wireless power transfer device including a power transfer element (e.g., base power transfer element)) transmits power to a secondary (or "pick-up") power receiver device (e.g., a vehicle charging unit (VCU), a vehicle pad, an electric vehicle wireless charging unit, or some other wireless power receiving device including a power transfer element (e.g., vehicle power transfer element)). Each of the transmitter and receiver power devices includes inductors, typically coils or windings of electric current conveying media. An alternating current in the primary inductor produces a fluctuating magnetic field. When the secondary inductor is placed in proximity to the primary inductor, the fluctuating magnetic field induces an electromotive force (EMF) in the secondary inductor, thereby transferring power to the secondary power receiver device. Accordingly, power may be transferred wirelessly from a wireless power transmitter to a wireless power receiver.

In some cases, it may be desirable to transfer power from a device including or coupled to a wireless power receiver to a device including or coupled to a wireless power transmitter. For example, power from a wireless electric vehicle may be used to supply power to a home, AC grid, or other AC device. The wireless electric vehicle may supply power during times of emergency where there is a power outage, during peak hours of AC grid usage to provide additional power to an AC grid, etc.

SUMMARY

In certain aspects, a method for controlling power transfer at a wireless power receiver is disclosed.

Certain aspects provide a wireless power receiver including a resonant circuit comprising a power transfer receive element configured to wirelessly receive power via a magnetic field for providing power to a battery. The wireless power receiver further includes a first switching circuit coupled to the resonant circuit, the first switching circuit configured to act as an inverter and generate a first signal, based on an output from the battery, at a resonant frequency of the resonant circuit, the first signal having an envelope at a first frequency. The wireless power receiver further includes a second switching circuit coupled to the resonant circuit, wherein the resonant circuit is configured to bias the second switching circuit at the resonant frequency in response to the first signal, wherein the second switching circuit is configured to act as a rectifier and is configured to extract the envelope to generate a second signal at half of the first frequency.

Certain aspects provide a controller for a wireless power receiver comprising a resonant circuit. The controller is configured to control one or more switches of a first switching circuit coupled to the resonant circuit to act as an inverter and generate a first signal, based on an output from a battery, at a resonant frequency of the resonant circuit, the first signal having an envelope at a first frequency. The controller is further configured to control one or more switches of a second switching circuit coupled to the resonant circuit to act as a rectifier and extract the envelope to generate a second signal at half of the first frequency, wherein the resonant circuit biases the second switching circuit at the resonant frequency in response to the first signal.

Certain aspects provide a computer readable medium having instructions stored thereon for performing a method for converting DC power to AC power by a wireless power receiver comprising a resonant circuit. The method includes controlling one or more switches of a first switching circuit coupled to the resonant circuit to act as an inverter and generate a first signal, based on an output from a battery, at a resonant frequency of the resonant circuit, the first signal having an envelope at a first frequency. The method further includes controlling one or more switches of a second switching circuit coupled to the resonant circuit to act as a rectifier and extract the envelope to generate a second signal at half of the first frequency, wherein the resonant circuit biases the second switching circuit at the resonant frequency in response to the first signal.

Certain aspects provide a method for converting DC power to AC power by a wireless power receiver comprising a resonant circuit. The method includes controlling one or more switches of a first switching circuit coupled to the resonant circuit to act as an inverter and generate a first signal, based on an output from a battery, at a resonant frequency of the resonant circuit, the first signal having an envelope at a first frequency. The method further includes controlling one or more switches of a second switching circuit coupled to the resonant circuit to act as a rectifier and extract the envelope to generate a second signal at half of the first frequency, wherein the resonant circuit biases the second switching circuit at the resonant frequency in response to the first signal.

Certain aspects provide a controller for a wireless power receiver comprising a resonant circuit. The wireless power receiver comprises means for controlling one or more switches of a first switching circuit coupled to the resonant circuit to act as an inverter and generate a first signal, based on an output from a battery, at a resonant frequency of the resonant circuit, the first signal having an envelope at a first frequency. The wireless power receiver further comprises means for controlling one or more switches of a second switching circuit coupled to the resonant circuit to act as a rectifier and extract the envelope to generate a second signal at half of the first frequency, wherein the resonant circuit biases the second switching circuit at the resonant frequency in response to the first signal.

Certain aspects provide a wireless power receiver apparatus. The apparatus includes a resonant circuit comprising a wireless power transfer element electrically coupled to one or more capacitors. The apparatus further includes a first power conversion circuit electrically coupled between the resonant circuit and a battery, the power conversion circuit comprising one or more switches. The apparatus further includes a second power conversion circuit electrically coupled to a node in between the resonant circuit and the first power conversion circuit, the second power conversion circuit configured to provide an AC output.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
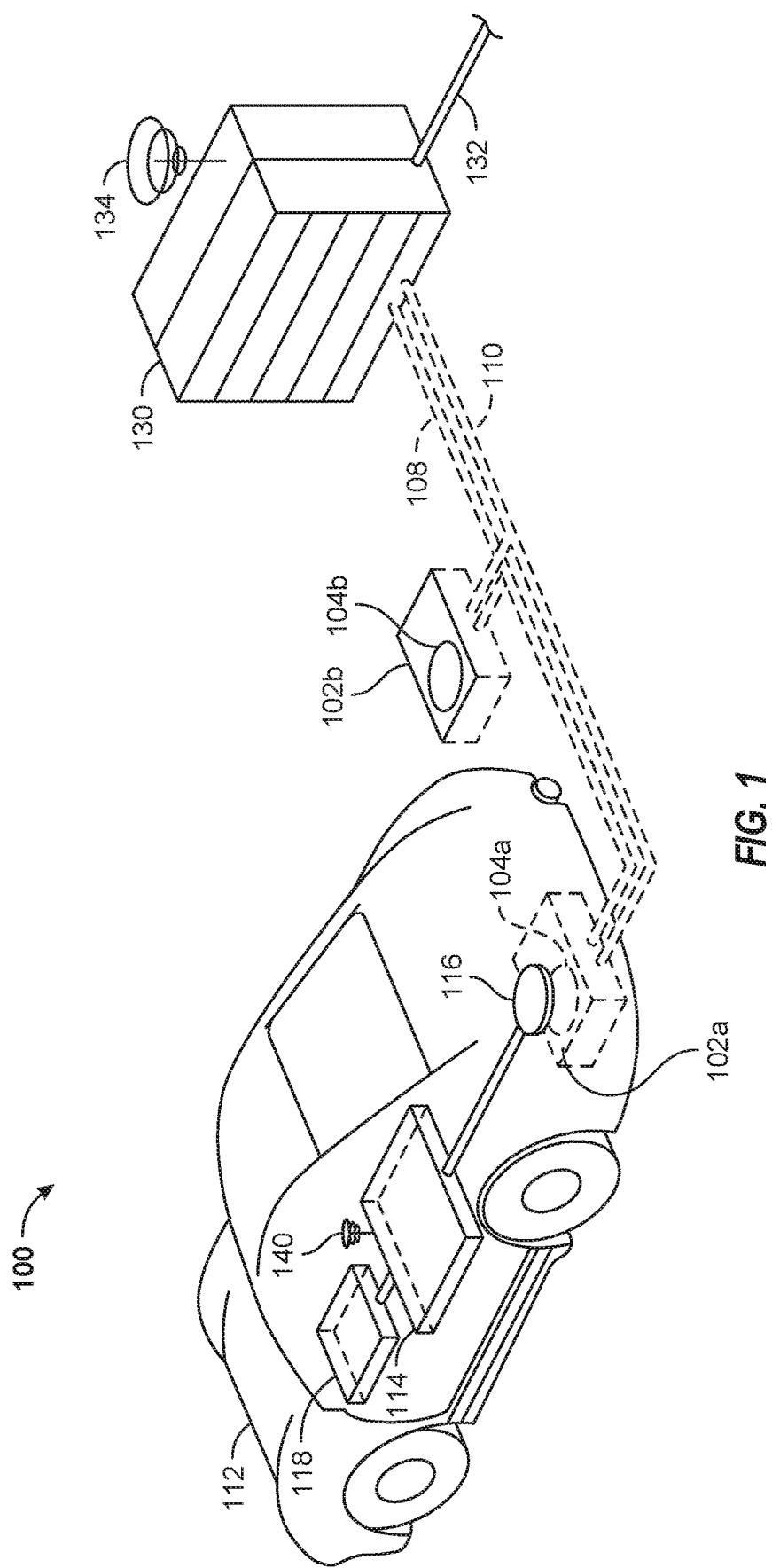
FIG. 1 illustrates a wireless power transfer system for charging an electric vehicle, in accordance with some implementations.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base power transfer element 104a and 104b, respectively, for wirelessly transferring power. In some other implementations (not shown in FIG. 1), base power transfer elements 104a or 104b may be stand-alone physical units and are not part of the base wireless charging system 102a or 102b.

The electric vehicle 112 may include a battery unit 118, an electric vehicle power transfer element 116, and an electric vehicle wireless charging unit 114. The electric vehicle wireless charging unit 114 and the electric vehicle power transfer element 116 constitute the electric vehicle wireless charging system. In some diagrams shown herein, the electric vehicle wireless charging unit 114 is also referred to as the vehicle charging unit (VCU). The electric vehicle power transfer element 116 may interact with the base power transfer element 104a for example, via a region of the electromagnetic field generated by the base power transfer element 104a.

In some exemplary implementations, the electric vehicle power transfer element 116 may receive power when the electric vehicle power transfer element 116 is located in an electromagnetic field produced by the base power transfer element 104a. The field may correspond to a region where energy output by the base power transfer element 104a may be captured by the electric vehicle power transfer element 116. For example, the energy output by the base power transfer element 104a may be at a level sufficient to charge or power the electric vehicle 112. In some cases, the field may correspond to a "near-field" of the base power transfer element 104a. The near-field may correspond to a region in which there are strong reactive fields resulting from the currents and charges in the base power transfer element 104a that do not radiate power away from the base power transfer element 104a. In some cases the near-field may correspond to a region that is within about ½π of a wavelength of the a frequency of the electromagnetic field produced by the base power transfer element 104a distant from the base power transfer element 104a, as will be further described below.

The electric vehicle power transfer element 116 and base power transfer element 104 as described throughout the disclosed implementations may be referred to or configured as "loop" antennas, and more specifically, multi-turn loop antennas. The elements 104 and 116 may also be referred to herein or be configured as "magnetic" antennas. The term "power transfer element" is intended to refer to a component that may wirelessly output or receive energy for coupling to another "power transfer element." The power transfer element may also be referred to as an "antenna" or a "coupler" of a type that is configured to wirelessly output or receive power. As used herein, power transfer elements 104 and 116 are examples of "power transfer components" of a type that are configured to wirelessly output, wirelessly receive, and/ or wirelessly relay power. Loop (e.g., multi-turn loop) antennas may be configured to include an air core or a physical core such as a ferrite core. An air core loop antenna may allow the placement of other components within the core area. Physical core antennas including ferromagnets or ferromagnetic materials may allow development of a stronger electromagnetic field and improved coupling.

Local distribution center 130 may be configured to communicate with external sources (e.g., a power grid) via a communication backhaul 134, and with the base wireless charging system 102a via a communication link 108.

In some implementations the electric vehicle power transfer element 116 may be aligned with the base power transfer element 104a and, therefore, disposed within a near-field region simply by the electric vehicle operator positioning the electric vehicle 112 such that the electric vehicle power transfer element 116 is sufficiently aligned relative to the base power transfer element 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the power transfer elements 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
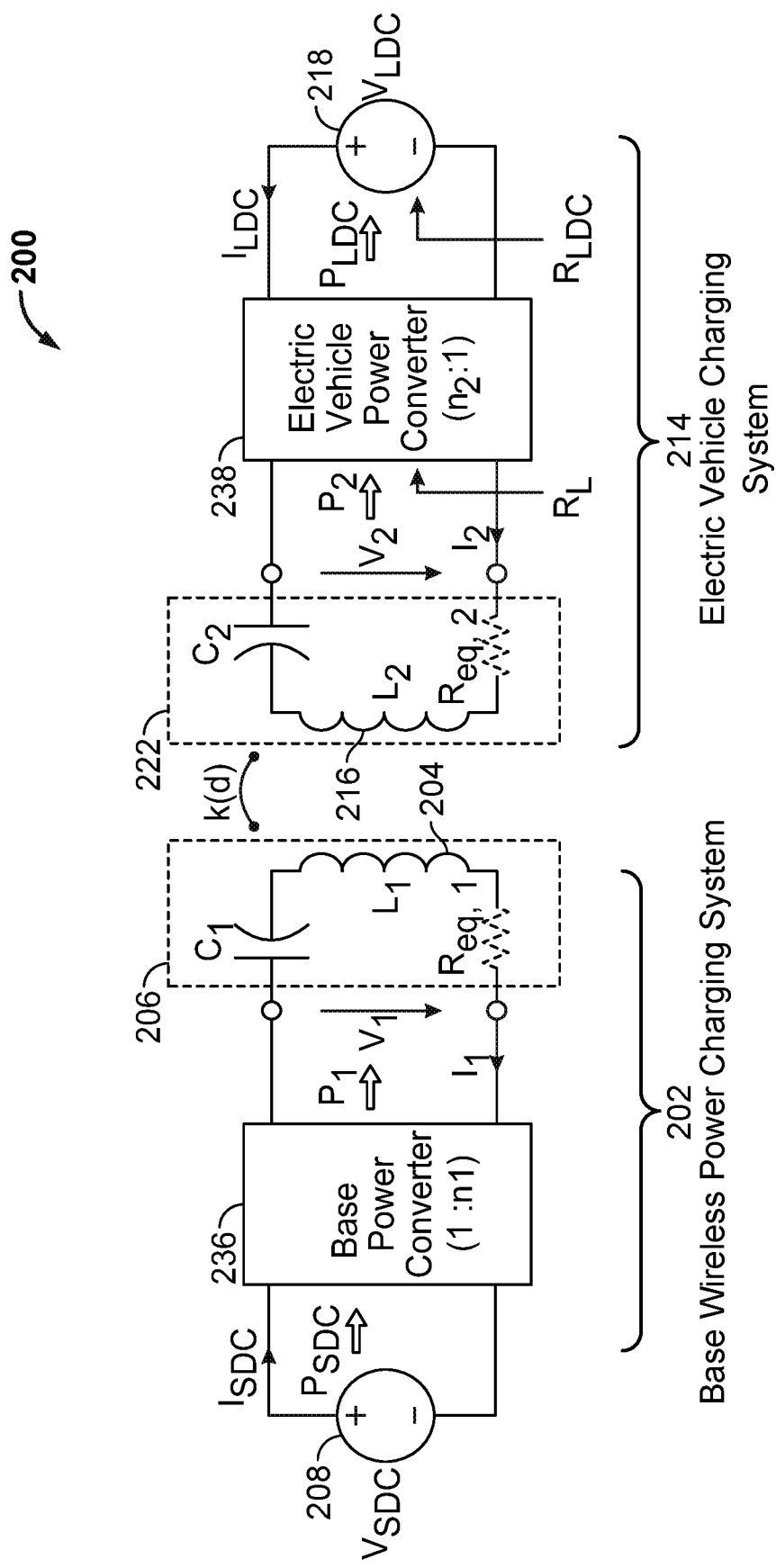
FIG. 2 is a schematic diagram of exemplary components of the wireless power transfer system of FIG. 1.

FIG. 2 is a schematic diagram of exemplary components of a wireless power transfer system 200 similar to that previously discussed in connection with FIG. 1, in accordance with some exemplary implementations. The wireless power transfer system 200 may include a base resonant circuit 206 including a base power transfer element 204 having an inductance L1. The wireless power transfer system 200 further includes an electric vehicle resonant circuit 222 including an electric vehicle power transfer element 216 having an inductance L2. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power transfer element 216 and the base power transfer element 204. Using resonant structures for coupling energy may be referred to as "magnetically coupled resonance," "electromagnetically coupled resonance," and/or "resonant induction." The operation of the wireless power transfer system 200 will be described based on power transfer from a base power transfer element 204 to an electric vehicle 112 (not shown), but is not limited thereto. For example, as discussed above, energy may be also transferred in the reverse direction.

With reference to FIG. 2, a power supply 208 (e.g., AC or DC) supplies power PSDC to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power P1 to the base resonant circuit 206 including tuning capacitor C1 in series with base power transfer element 204 to emit an electromagnetic field at the operating frequency. The series-tuned resonant circuit 206 should be construed as exemplary. In another implementation, the capacitor C1 may be coupled with the base power transfer element 204 in parallel. In yet other implementations, tuning may be formed of several reactive elements in any combination of parallel or series topology. The capacitor C1 may be provided to form a resonant circuit with the base power transfer element 204 that resonates substantially at the operating frequency. The base power transfer element 204 receives the power P1 and wirelessly transmits power at a level sufficient to charge or power the electric vehicle. For example, the level of power provided wirelessly by the base power transfer element 204 may be on the order of kilowatts (kW) (e.g., anywhere from 1 kW to 110 kW, although actual levels may be or higher or lower).

The base resonant circuit 206 (including the base power transfer element 204 and tuning capacitor C1) and the electric vehicle resonant circuit 222 (including the electric vehicle power transfer element 216 and tuning capacitor C2) may be tuned to substantially the same frequency. The electric vehicle power transfer element 216 may be positioned within the near-field of the base power transfer element and vice versa, as further explained below. In this case, the base power transfer element 204 and the electric vehicle power transfer element 216 may become coupled to one another such that power may be transferred wirelessly from the base power transfer element 204 to the electric vehicle power transfer element 216. The series capacitor C2 may be provided to form a resonant circuit with the electric vehicle power transfer element 216 that resonates substantially at the operating frequency. The series-tuned resonant circuit 222 should be construed as being exemplary. In another implementation, the capacitor C2 may be coupled with the electric vehicle power transfer element 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances Req, 1 and Req, 2 represent the losses that may be inherent to the base and electric vehicle power transfer elements 204 and 216 and the tuning (anti-reactance) capacitors C1 and C2, respectively. The electric vehicle resonant circuit 222, including the electric vehicle power transfer element 216 and capacitor C2, receives and provides the power P2 to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power PLDC to the load 218. The power supply 208, base power converter 236, and base power transfer element 204 may be stationary and located at a variety of locations as discussed above. The electric vehicle load 218 (e.g., the electric vehicle battery unit), electric vehicle power converter 238, and electric vehicle power transfer element 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle power transfer element 216 to the base wireless power charging system 202 to feed power back to the grid. Each of the electric vehicle power transfer element 216 and the base power transfer element 204 may act as transmit or receive power transfer elements based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle power transfer element 216 to the electric vehicle power converter 238. Disconnecting the electric vehicle power transfer element 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base power transfer element 204 as further explained below.

As described above, in operation, during energy transfer towards an electric vehicle (e.g., electric vehicle 112 of FIG. 1), input power is provided from the power supply 208 such that the base power transfer element 204 generates an electromagnetic field for providing the energy transfer. The electric vehicle power transfer element 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle power transfer element 216 is located in the near-field coupling mode region of the base power transfer element 204 as further explained below.

As stated, an efficient energy transfer occurs by transferring energy via a magnetic near-field rather than via electromagnetic waves in the far field, which may involve substantial losses due to radiation into the space. When in the near-field, a coupling mode may be established between the transmit power transfer element and the receive power transfer element. The space around the power transfer elements where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle power transfer element 216 and base power transfer element 204 as described throughout the disclosed implementations may be referred to or configured as "conductor loops", and more specifically, "multi-turn conductor loops" or coils. The base and electric vehicle power transfer elements 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a power transfer element (e.g., the base power transfer element 204 and capacitor C2) as described above. As shown in FIG. 2, inductance may generally be the inductance of the power transfer element, whereas, capacitance may be added to the power transfer element to create a resonant structure at a desired resonant frequency. Accordingly, for larger size power transfer elements using larger diameter coils exhibiting larger inductance, the value of capacitance needed to produce resonance may be lower. Inductance may also depend on a number of turns of a coil. Furthermore, as the size of the power transfer element increases, coupling efficiency may increase. This is mainly true if the size of both base and electric vehicle power transfer elements increase. Furthermore a resonant circuit including a power transfer element and tuning capacitor may be designed to have a high quality (Q) factor to improve energy transfer efficiency. For example, the Q factor may be 300 or greater.

As described above, according to some implementations, coupling power between two power transfer elements that are in the near-field of one another is disclosed. As described above, the near-field may correspond to a region around the power transfer element in which mainly reactive electromagnetic fields exist. If the physical size of the power transfer element is much smaller than the wavelength, inversely proportional to the frequency, there is no substantial loss of power due to waves propagating or radiating away from the power transfer element. Near-field coupling-mode regions may correspond to a volume that is near the physical volume of the power transfer element, typically within a small fraction of the wavelength. According to some implementations, magnetic power transfer elements, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power transfer elements (e.g., dipoles and monopoles) or a combination of magnetic and electric power transfer elements may be used.

Figure 3:
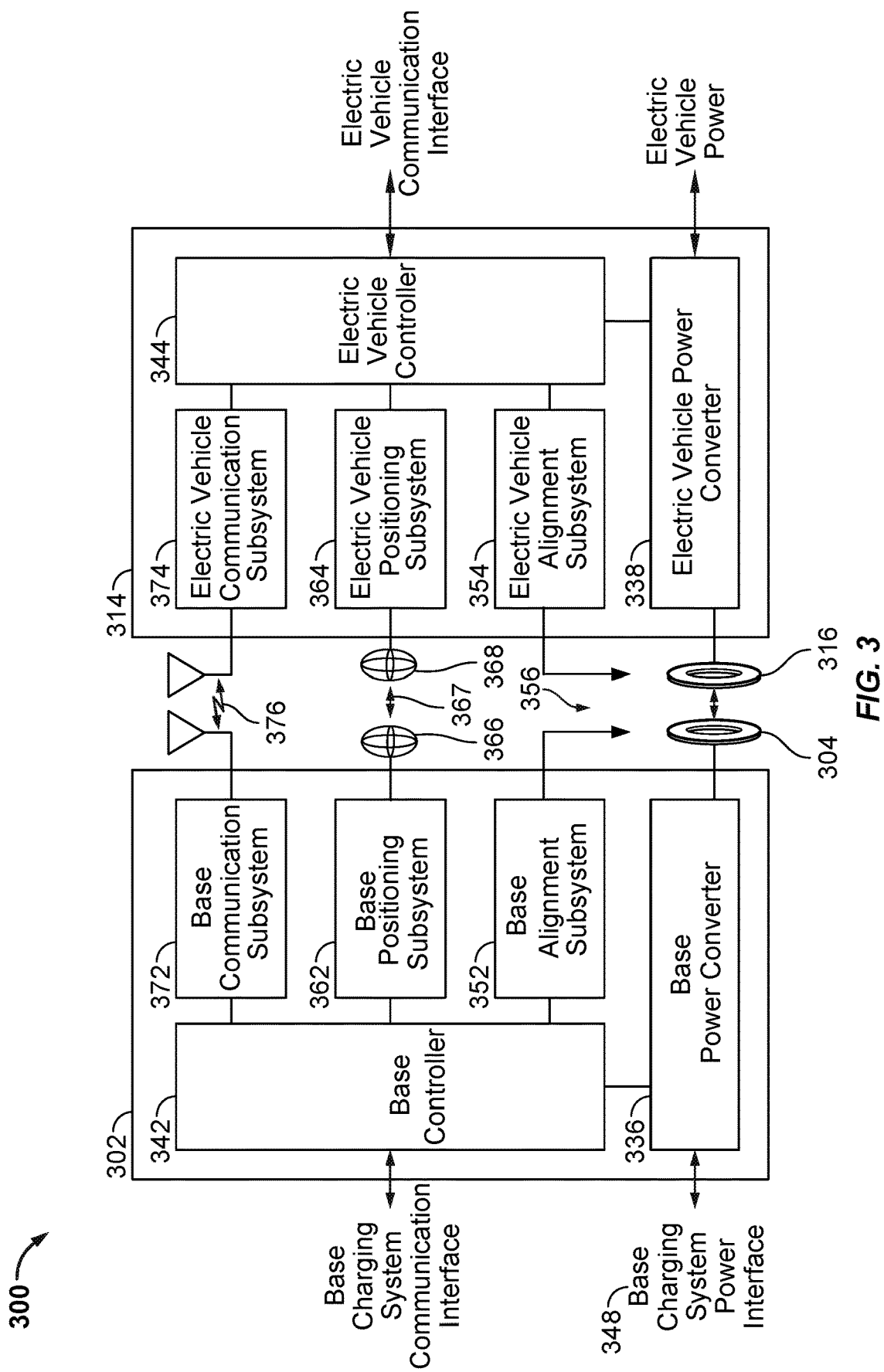
FIG. 3 is a functional block diagram showing exemplary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a positioning link 367, using, for example, a magnetic field signal for determining a position or direction, and an alignment mechanism 356 capable of mechanically moving one or both of the base power transfer element 304 and the electric vehicle power transfer element 316. Mechanical (kinematic) alignment of the base power transfer element 304 and the electric vehicle power transfer element 316 may be controlled by the base alignment subsystem 352 and the electric vehicle charging alignment subsystem 354, respectively. The positioning link 367 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base power transfer element 304 at a frequency near or at the resonant frequency of the base resonant circuit 206 with reference to FIG. 2. The electric vehicle power transfer element 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle power transfer element 316 to a power signal suitable for charging a battery via the electric vehicle power interface.

The base wireless charging system 302 includes a base controller 342 and the electric vehicle wireless charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or circuits for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base power transfer element 304 and the electric vehicle power transfer element 316, for example via autonomous mechanical (kinematic) alignment, by either the electric vehicle alignment subsystem 354 or the base alignment subsystem 352, or by both, or with operator assistance.

The electric vehicle wireless charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator

368. The base positioning subsystem 362 may be configured to receive these voltage signals and output a signal indicative of a position estimate and an angle estimate between the magnetic field sensor 366 and the magnetic field sensor 368. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power transfer elements 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle wireless charging system 314. The electric vehicle wireless charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle wireless charging system 314, the wireless power transfer system 300 may use in-band signaling via base and electric vehicle power transfer elements 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power transfer elements 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base power transfer element 304. By way of example, a load sensing circuit monitors the current flowing to a power amplifier of the base power converter 336, which is affected by the presence or absence of active power receivers in the near-field coupling mode region of the base power transfer element 304. Detection of changes to the loading on the power amplifier may be monitored by the base controller 342 for use in determining whether to enable the base wireless charging system 302 for transmitting energy, to communicate with a receiver, or a combination thereof.

As discussed, in certain aspects, an electric vehicle (e.g., electric vehicle 112) can transmit power to a base wireless charging system (e.g., base wireless charging system 102*a*). For example, an electric vehicle charging system (e.g., an electric vehicle charging system 214) may provide power wirelessly through an electric vehicle power transfer element (e.g., electric vehicle power transfer element 216) to a base wireless power charging system (e.g., base wireless power charging system 14) via a base power transfer element (e.g., base power transfer element 204).

To provide power from the electric vehicle to the base wireless charging system, power may be transferred wirelessly from the electric vehicle to the base wireless charging system. The power at the electric vehicle may be stored in a battery, which outputs DC power. The base wireless charging system may supply the received power to a grid that operates on AC power. Accordingly, several conversion steps may be necessary to transfer the power from the electrical vehicle to the AC grid, including those discussed to wirelessly transfer power between the electric vehicle and the base wireless charging system and to convert the DC power to AC power. Each conversion step may decrease the efficiency of the power transfer.

Further, it may not always be feasible to wirelessly transfer power from the electric vehicle to the base wireless charging system. Without the base wireless charging system and the electric vehicle charging system being in the same location, aligned, and synchronized, wireless power transfer may not be possible. For example, in emergency situations, it may not be possible to align the base wireless charging system with the electric vehicle charging system for wireless power transfer.

Accordingly, certain aspects herein relate to an electric vehicle charging system configured to allow for DC power from the vehicle battery to be converted to power suitable for output to a grid or AC device, such as using a wired connection between the electric vehicle charging system and the grid or AC device directly. Examples of AC devices that may be powered from the vehicle battery include in-car systems that run on AC, heating, ventilation, and air conditioning (HVAC) systems, household appliances, emergency medical devices, etc. In certain aspects, some existing hardware of the electric vehicle charging system is repurposed and controlled using a controller to convert the power, thereby reducing the need for additional circuitry to perform the power conversion. In particular, the electric vehicle charging systems described with respect to aspects herein may be operate in two different modes, a charging mode (e.g., normal mode) and a discharging mode (e.g., reverse mode). In the charging mode the electric vehicle charging system is configured to receive wireless power from a wireless power transmitter, convert the received power to DC power, and charge the vehicle battery. In the discharging mode, the electric vehicle charging system is configured to take DC power from the vehicle battery, convert the DC power to AC power, and output the AC power.

It should be noted that though certain aspects herein are described with respect to an electric vehicle providing power to an AC grid, the aspects may also be used for DC to AC power conversion by other types of wireless power receivers and used to provide AC power to other systems (e.g., devices, power networks, etc.).

Figure 4:
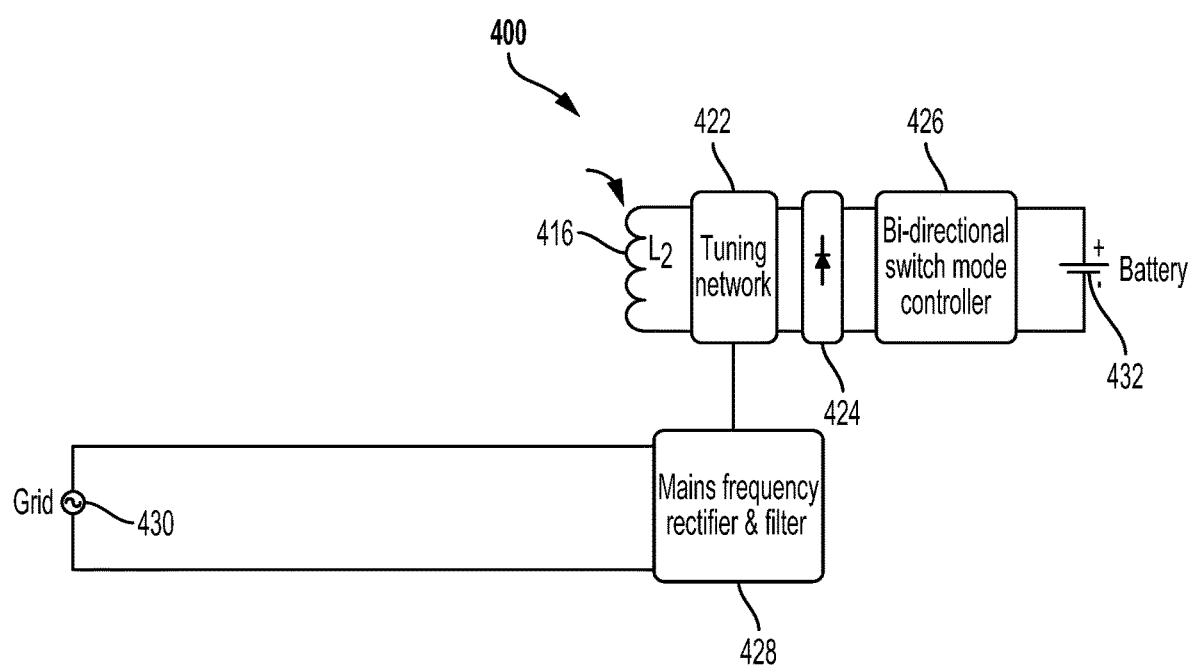
FIG. 4 is a schematic diagram of exemplary components of a wireless power receiver.

FIG. 4 is a schematic diagram of exemplary components of a wireless power receiver 400 (e.g., an electric vehicle charging system 214), in accordance with certain aspects discussed herein. As shown, the wireless power receiver 400 includes a tuning network 422 (e.g., electric vehicle resonant circuit 222) including a power transfer element 416 (e.g., electric vehicle power transfer element 216), a rectifier circuit 424 (e.g., an active/controlled rectifier circuit), and a bi-directional switch mode controller 426 (e.g. that may operate as a DC-DC converter (e.g., a boost converter) for received wireless power). The rectifier circuit 424 is an example of a switching circuit, e.g., a first switching circuit, as it may include a plurality of transistors for performing rectification/inversion. The rectifier circuit 424 is also an example of a power conversion circuit, e.g., first power conversion circuit. Further, though power transfer element 416 is illustrated as separate from the tuning network 422, it should be noted that power transfer element 416 may be considered a component of tuning network 422.

In a charging mode, the wireless power receiver 400 may be configured to receive wireless power from a base wireless power charging system, such as base wireless power charging system 202, and charge vehicle battery 432, such as described herein.

In a discharging mode, the wireless power receiver 400 is further configured to provide power (e.g., via a wired connection) to an AC grid from a DC power source (e.g., vehicle battery 432). In particular, the wireless power receiver 400 further includes a mains frequency rectifier and filter 428 (e.g., an active/controlled rectifier) coupled to the tuning network 422 (e.g., between the tuning network 422 and the rectifier circuit 424, for example at a node) and further coupled to an AC grid 430. The mains frequency rectifier and filter 428 is an example of a switching circuit, e.g., a second switching circuit, as it may include a plurality of transistors for performing rectification. The mains frequency rectifier and filter 428 is also an example of a power conversion circuit, e.g., second power conversion circuit. When providing power to the AC grid 430, the bi-directional switch mode controller 426 may be operated as a buck converter and used to generate a modified sine wave (e.g., a modified rectified sine wave) from the DC power supplied from vehicle battery 432 at an input to the rectifier circuit 424. The bi-directional switch mode controller 426 may generate the modified sine wave at a frequency equal to double (or scaled by another factor, such as an integer factor) an operating frequency of the AC grid 430 due to the generated voltage waveform being a rectified sine wave. For example, the operating frequency of the AC grid 430 may be, for example 50 Hz, 60 Hz, etc., so the bi-directional switch mode controller 426 may generate the modified sine wave at 100 Hz, 120 Hz, etc. Operation of the bi-directional switch mode controller 426 may be performed by a suitable controller or circuit, such as an application-specific integrated circuit (ASIC), a processor, a field programmable gate array (FPGA), a power management integrated circuit (PMIC), etc. such as electric vehicle controller 344.

The rectifier circuit 424 may be operated at a resonant frequency (e.g., 85 kHz) of the tuning network 422, based on the tuning network 422 resonating at the resonant frequency. For example, the operation of the rectifier circuit 424 may be controlled by the same controller or circuit as bi-directional switch mode controller 426 or another suitable controller or circuit. Accordingly, at the output (e.g., at a coupling point/node between rectifier circuit 424 and tuning network 422) of the rectifier circuit 424 in the discharging mode, the rectifier circuit 424 may generate a signal with an envelope at the frequency of the modified sine wave (e.g., at 100 Hz, 120 Hz, etc.), and a signal at the resonant frequency (e.g., 85 kHz) within the envelope.

The mains frequency rectifier and filter 428 may operate as a rectifier (e.g., include a rectifier circuit) at the frequency of the modified sine wave (e.g., at 100 Hz, 120 Hz, etc.). For example, the operation of the mains frequency rectifier and filter 428 may be controlled by the same controller or circuit as bi-directional switch mode controller 426 or another suitable controller or circuit. Acting as a rectifier, the mains frequency rectifier and filter 428 extracts the envelope of the signal at the output of the rectifier circuit 424 in the discharging mode to generate a power signal suitable for input into the AC grid 430. For example, the mains frequency rectifier and filter 428 may generate a 230V 50 Hz AC signal, a 110V 60 Hz AC signal, etc. In particular, the mains frequency rectifier and filter 428 generates the AC signal at half (or scaled by another factor, such as an integer factor) the frequency of the modified sine wave generated by the bi-directional switch mode controller 426 by extracting the envelope signal by operating at the frequency of the modified sine wave.

The mains frequency rectifier and filter 428 may further filter the generated AC signal, such as to attenuate ripple in the AC signal (e.g., due to the 85 kHz resonant signal within the envelope of the signal at the output of the rectifier circuit 424 in the discharging mode), and output the filtered signal to the AC grid 430. In certain aspects, the mains frequency rectifier and filter 428 includes a pi filter configured to perform such filtering.

Based on the described operation, DC power from the vehicle battery 432 is converted by components of a wireless power receiver to an AC signal suitable for output to the AC grid 430. In particular, the tuning network 422 is used to resonate at the resonant frequency of the tuning network 422 and bias diodes of a rectifier circuit of the mains frequency rectifier and filter 428. For example, during power reception from a base wireless power charging system, normally the tuning network 422 resonates at the resonant frequency to bias rectifier circuit 424 at the resonant frequency in order to convert received wireless power to a suitable DC signal. For generating a signal suitable for output to the AC grid 430, the tuning network 422 is used to resonate at the resonant frequency with the envelope signal and used to bias diodes of a rectifier circuit of the mains frequency rectifier and filter 428 as a rectifier at the frequency of the modified sine wave generated by the bi-directional switch mode controller 426. Accordingly, the real power output from the rectifier circuit 424 in the discharging mode bypasses the tuning network 422, and is shunt to the mains frequency rectifier and filter 428 for output to the AC grid 430.

Figure 5:
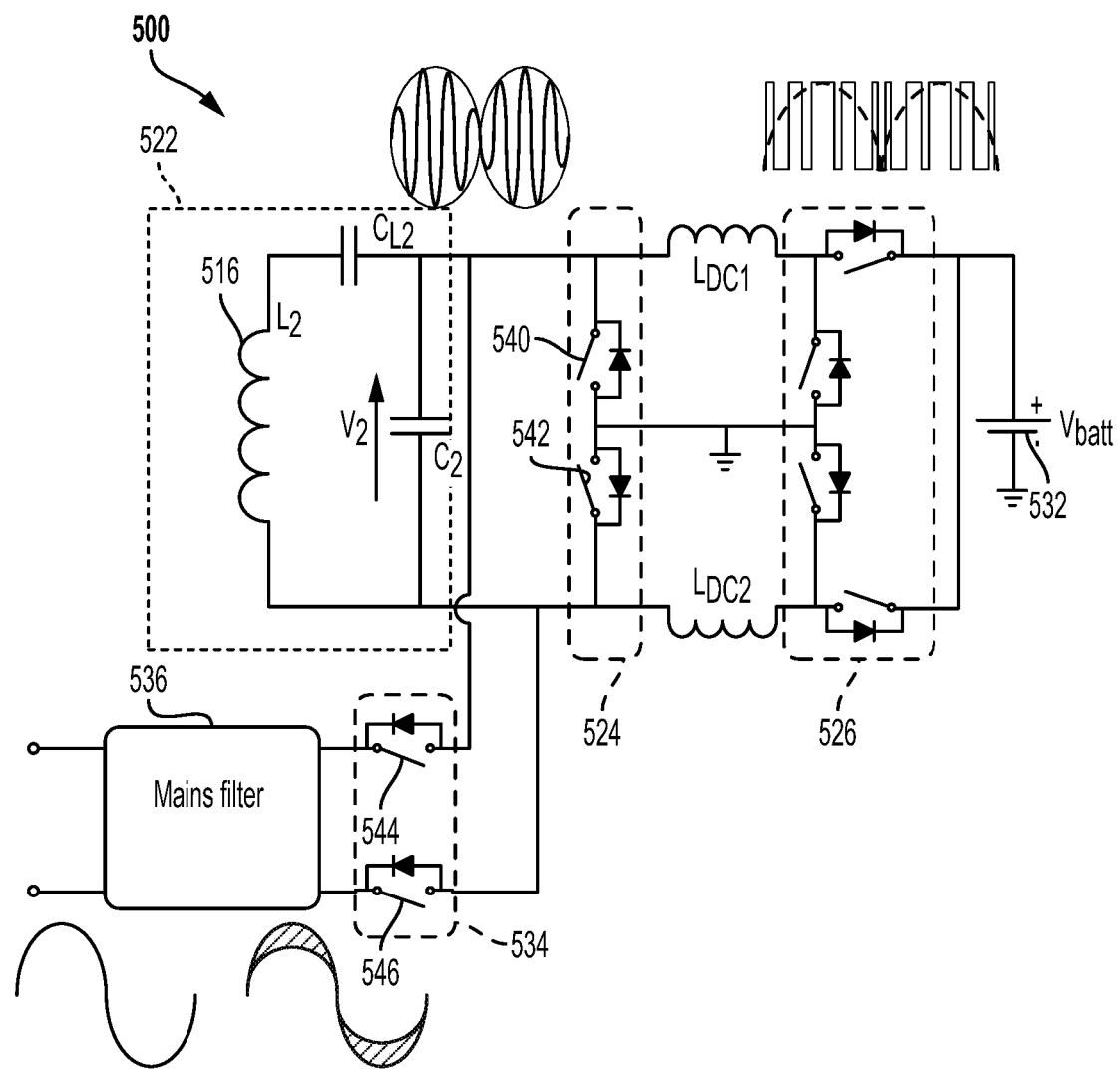
FIG. 5 is a circuit diagram of exemplary components of a wireless power receiver.

FIG. 5 is a circuit diagram of exemplary components of a wireless power receiver 500 (e.g., an electric vehicle charging system 214), in accordance with certain aspects discussed herein. For example, wireless power receiver 500 may be an example implementation of wireless power receiver 400 using an active current doubler with partial series tuning topology. Wireless power receiver 500 includes a power transfer element 516 (e.g., power transfer element 416), a tuning network 522 (e.g., tuning network 422), a half-bridge inverter 524 (e.g., rectifier circuit 424), and a bi-directional switch mode controller 526 (e.g., bi-directional switch mode controller 426). The half-bridge inverter 524 is an example of a switching circuit, e.g., a first switching circuit, as it may include a plurality of transistors for performing rectification/inversion. The half-bridge inverter 524 is also an example of a power conversion circuit, e.g., first power conversion circuit. The wireless power receiver 500 further includes a mains frequency converter 534 and a mains filter 536 (e.g., corresponding to mains frequency rectifier and filter 428). The mains frequency converter 534 is an example of a switching circuit, e.g., a second switching circuit, as it may include a plurality of transistors for performing rectification. The mains frequency converter 534 is also an example of a power conversion circuit, e.g., second power conversion circuit.

The power transfer element 516 includes an inductor $L_2$, as shown. The tuning network 522 includes a capacitor $C_{L2}$ coupled in series with the inductor $L_2$. The tuning network 522 further includes a capacitor $C_2$ coupled in parallel with the inductor $L_2$. The tuning network 522 is coupled to the half-bridge inverter 524. The half-bridge inverter 524 includes two switches 540 and 542 (e.g., transistors) coupled in parallel with the tuning network 522. The diodes shown in parallel to switches 540 and 542 may, in certain aspects, correspond to the body diodes of the switches 540 and 542 themselves, which may act as a rectifier. In some aspects, the diodes may be separate diodes to act as a rectifier.

The half-bridge inverter 524 is further coupled to DC inductors $L_{DC1}$ and $L_{DC2}$. DC inductors $L_{DC1}$ and $L_{DC2}$ are further coupled to the bi-directional switch mode controller 526. The bi-directional switch mode controller 526 includes a plurality of switches (e.g., transistors). For example, as shown, the bi-directional switch mode controller 526 includes two switches coupled in parallel with the half-bridge inverter 524. The bi-directional switch mode controller 526 further includes two switches coupled in series with DC inductors $L_{DC1}$ and $L_{DC2}$. The diodes shown in parallel to the switches of bi-directional switch mode controller 526 may, in certain aspects, correspond to the body diodes of the switches themselves. In some aspects, the diodes may be separate diodes.

The switches of the bi-directional switch mode controller 526 may be operated in different modes (e.g., as a boost converter, as a buck converter, etc.) as discussed herein. Operation of the bi-directional switch mode controller 526 may be performed by a suitable controller or circuit, such as an application-specific integrated circuit (ASIC), a processor, a field programmable gate array (FPGA), a power management integrated circuit (PMIC), etc. such as electric vehicle controller 344. The bi-directional switch mode controller 526 is further coupled to a battery 532.

The mains frequency converter 534 is coupled between the tuning network 522 and the half-bridge inverter 524, e.g., at a node. The mains frequency converter 534 as shown includes switches 544 and 546 (e.g., transistors). The diodes shown in parallel to switches 544 and 546 may, in certain aspects, correspond to the body diodes of the switches 544 and 546 themselves, which may act as a rectifier. In some aspects, the diodes may be separate diodes to act as a rectifier. The mains frequency converter 534 is further coupled in series to mains filter 536. Mains filter 536 may comprise a pi filter (e.g., CLC pi filter).

The switches 544 and 546 of the mains frequency converter 534 may be controlled by a suitable controller or circuit, such as an application-specific integrated circuit (ASIC), a processor, a field programmable gate array (FPGA), a power management integrated circuit (PMIC), etc. such as electric vehicle controller 344.

As described with respect to wireless power receiver 400, in the discharging mode, the wireless power receiver 500 can generate an appropriate AC signal for an AC grid from the DC battery power signal from battery 532. For example, the bi-directional switch mode controller 526 may be operated as a buck converter and used to generate a modified sine wave (e.g., modified rectified sine wave) at twice (or scaled by another factor, such as an integer factor) a mains frequency from the voltage provided from battery 532 at the input of the DC inductors $L_{DC1}$ and $L_{DC2}$. The half-bridge inverter 524 is then operated at the resonant frequency of the tuning network 522. Therefore, at the output (e.g., at a coupling point/node between half-bridge inverter 524 and tuning network 522) of the half-bridge inverter 524 in the discharging mode, there is a signal with an envelope at twice the mains frequency with the resonant signal at the resonant frequency of the tuning network 522 within the envelope. The mains frequency converter 534 (e.g., switching at twice (or scaled by another factor, such as an integer factor) the mains frequency) acts as a rectifier and extracts the envelope of the signal to form the AC signal at the mains frequency. The output is then sent through mains filter 536 to attenuate the ripple from the resonant frequency in the resonant signal.

Figure 6:
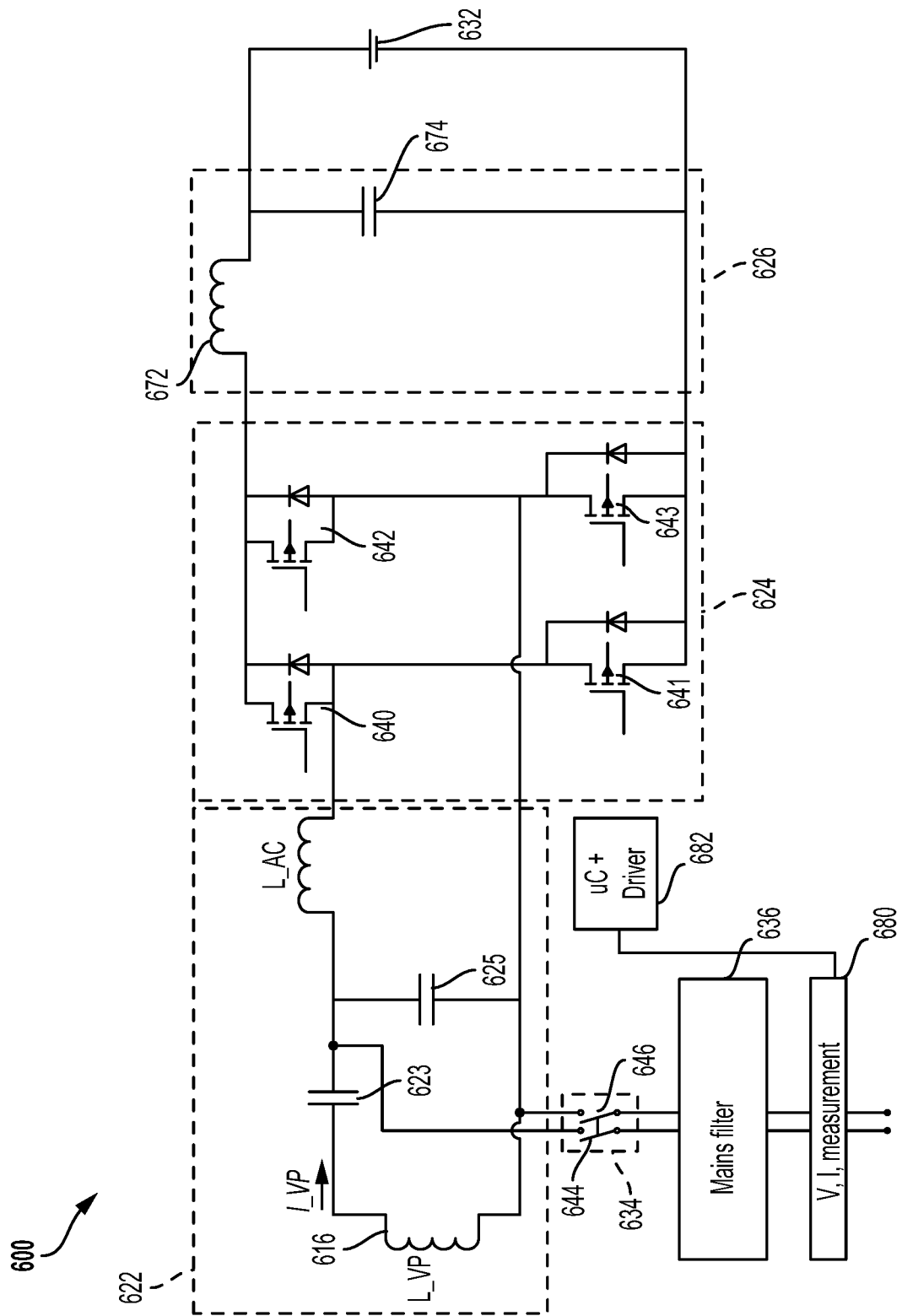
FIG. 6 is a circuit diagram of exemplary components of a wireless power receiver.

FIG. 6 is a circuit diagram of exemplary components of a wireless power receiver 600 (e.g., an electric vehicle charging system 214), in accordance with certain aspects discussed herein. For example, wireless power receiver 600 may be an example implementation of a wireless power receiver similar to wireless power receiver 400 using a partial series active rectifier topology. Wireless power receiver 600 includes a power transfer element 616 (e.g., power transfer element 416), a tuning network 622 (e.g., tuning network 422), a rectifier circuit 624 (e.g., rectifier circuit 424), and an output filter 626. The rectifier circuit 624 is an example of a switching circuit, e.g., a first switching circuit, as it may include a plurality of transistors for performing rectification/inversion. The rectifier circuit 624 is also an example of a power conversion circuit, e.g., first power conversion circuit. Though rectifier circuit 624 is labeled as a "rectifier circuit" due to its rectification operation in the charging mode, when the wireless power receiver 600 is operated in a discharging mode, rectifier circuit 624 may act as an inverter. The wireless power receiver 600 further includes a mains frequency converter 634 and a mains filter 636 (e.g., corresponding to mains frequency rectifier and filter 428). The mains frequency converter 634 is an example of a switching circuit, e.g., a second switching circuit, as it may include a plurality of transistors for performing rectification. The mains frequency converter 634 is also an example of a power conversion circuit, e.g., second power conversion circuit.

The power transfer element 616 includes an inductor $L_{VP}$, as shown. The tuning network 622 includes a capacitor 623 (e.g., a reactance matching capacitor) coupled in series with the inductor $L_{VP}$. The tuning network 622 further includes a capacitor 625 (e.g., a parallel tuning capacitor) coupled in parallel with the inductor $L_{VP}$. The tuning network further includes an inductor $L_{4C}$, as shown. The tuning network 622 is an example of a LCL resonant network, and the inductor $L_{VP}$, capacitor 623, and capacitor 625 form the parallel tuned section of the LCL resonant network.

The tuning network 622 is further coupled to the rectifier circuit 624. The rectifier circuit 624 includes a plurality of switches (e.g., transistors, MOSFETs, etc.). In particular, rectifier circuit 624 includes switches 640, 641, 642, and 643. The diodes shown in parallel to switches 640, 641, 642, and 643 may, in certain aspects, correspond to the body diodes of the switches 640, 641, 642, and 643 themselves, which may act as a rectifier. In some aspects, the diodes may be separate diodes to act as a rectifier. In certain aspects, the switches 640, 641, 642, and 643 form a symmetrical bridge (S-bridge). In certain aspects, the rectifier circuit 624 is a rectifier capable of performing clamping and performing DC-to-AC power conversion in addition to AC-to-DC power conversion.

The switches 640, 641, 642, and 643 of the rectifier circuit 624 may be controlled by a suitable controller or circuit, such as an application-specific integrated circuit (ASIC), a processor, a field programmable gate array (FPGA), a power management integrated circuit (PMIC), etc. such as electric vehicle controller 344.

The rectifier circuit 624 is further coupled to the output filter 626, which is coupled to the battery 632. The output filter includes an inductor 672 (e.g., having a small inductance, such as 5 µH) and capacitor 674 (e.g., 40 µF) configured to act as a filter. The output filter further includes a capacitor The output filter, in certain aspects, is configured to filter the DC signal output from the rectifier circuit 624 (e.g., reduce ripple) before input to the battery 632 to charge the battery 632, such as when wireless power receiver 600 receives wireless power from a wireless power transmitter.

The mains frequency converter 634 is coupled to the tuning network 622. In particular, the mains frequency converter 634 is coupled across the parallel tuned network of the tuning network 622 as shown. The mains frequency converter 634 as shown includes switches 644 and 646 (e.g., transistors, relays, etc.). The mains frequency converter 634 is further coupled in series to mains filter 636. Mains filter 636 may comprise a pi filter (e.g., CLC pi filter).

The switches 644 and 646 of the mains frequency converter 634 may be controlled by a suitable controller or circuit, such as an application-specific integrated circuit (ASIC), a processor, a field programmable gate array (FPGA), a power management integrated circuit (PMIC), etc. such as electric vehicle controller 344.

As described with respect to wireless power receiver 400, the wireless power receiver 600 can generate an appropriate AC signal for an AC grid from the DC battery power signal from battery 632. For example, the rectifier circuit 624 may be operated to generate a signal at a first frequency (e.g., resonant frequency of tuning network 622, such as 85 kHz) to resonate the tuning network 622. Accordingly, power from the battery 632 flows through the rectifier circuit 624. The rectifier circuit 624, in addition to being operated to generate the signal at the first frequency, may be operated to generate an envelope signal at twice (or scaled by another factor, such as an integer factor) the mains frequency. For example, the duty cycle of the switches 640-643 of the rectifier circuit 624 may be modulated to generate the envelope signal. Accordingly, the resonant voltage at the tuning network 622 (e.g., at the output of the rectifier circuit 624 in the discharging mode, such as at a coupling point between the rectifier circuit 624 and tuning network 622) is a signal with an envelope (e.g., at twice the mains frequency) with a resonant signal at the first frequency within the envelope. The mains frequency converter 634 (e.g., switching at the envelope signal frequency) acts as a rectifier and extracts the envelope of the signal to form the AC signal at the mains frequency. The output is then sent through mains filter 636 to attenuate the ripple from the first frequency in the resonant signal.

In certain aspects, the mains filter 636 outputs the AC signal to a V,I measurement component 680 configured to measure a voltage and current of the AC signal. The measured voltage and current information of the AC signal may then be sent from the measurement component 680 to a micro-controller (uC+) driver 682. The micro-controller driver 682 may be used to drive a light emitting diode (LED) based on the voltage and current information of the AC signal such as to display information regarding the AC signal. For example, the micro-controller driver 682 may be configured to drive the LED at a first color (e.g., red) if the measured voltage and current are not in a suitable range for powering an AC device, and may be configured to drive the LED at a second color (e.g., green) if the measured voltage and current are in a suitable range for powering an AC device.

Figure 7:
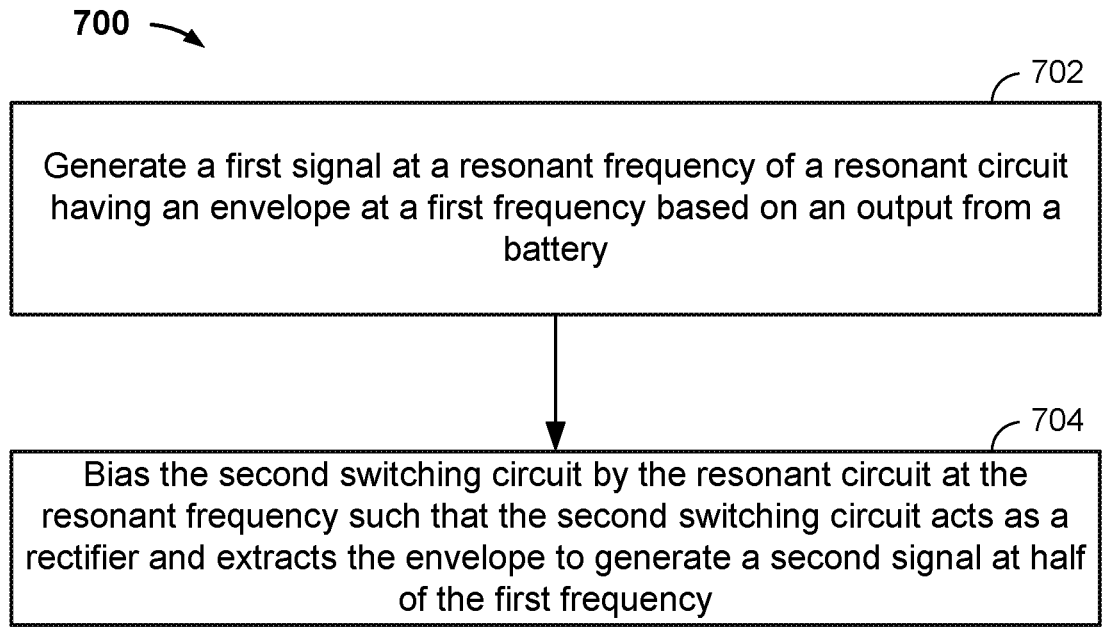
FIG. 7 is a flowchart illustrating example operations for converting DC power to AC power at a wireless power receiver.

FIG. 7 is a flowchart illustrating example operations 700 for converting DC power to AC power at a wireless power receiver. For example, the operations 700 may be performed by a controller, such as electric vehicle controller 344, to control a wireless power receiver (e.g., switches of a mains frequency converter, rectifier circuit, and/or bi-directional switch mode controller of a wireless power receiver), such as wireless power receiver 400, 500, or 600.

At 702, a first switching circuit (e.g., a bi-directional switch mode controller and/or rectifier circuit) is controlled to generate a first signal at a resonant frequency of a resonant circuit (e.g., tuning network) having an envelope at a first frequency (e.g., twice mains frequency) based on an output from a battery (e.g., vehicle battery coupled to a wireless power receiver).

At 704, a second switching circuit is biased by the resonant circuit at the resonant frequency such that the second switching circuit acts as a rectifier and extracts the envelope to generate a second signal at the half of the first frequency.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless power receiver, comprising:
a resonant circuit comprising a power transfer receive element configured to wirelessly receive power via a magnetic field for providing power to a battery;
a first switching circuit coupled to the resonant circuit between the power transfer receive element and the battery, the first switching circuit configured to act as an inverter and generate a first signal, based on an output from the battery in a discharging mode, at a resonant frequency of the resonant circuit, the first signal having an envelope at a first frequency; and
a second switching circuit directly coupled to the resonant circuit between the power transfer receive element and the first switching circuit, wherein the resonant circuit is configured to, during the discharging mode of the battery, bias the second switching circuit at the resonant frequency in response to the first signal, wherein the second switching circuit is configured to perform rectification and is configured to extract the envelope to generate a second signal at half of the first frequency.

2. The wireless power receiver of claim 1, further comprising a filter circuit electrically coupled to the second switching circuit, the filter circuit configured to filter ripple at the resonant frequency from the second signal.

3. The wireless power receiver of claim 1, wherein the resonant circuit is further configured to couple to the magnetic field and resonate at the resonant frequency to bias the first switching circuit at the resonant frequency to perform rectification to convert wireless power received at the resonant circuit from AC to DC for charging the battery.

4. The wireless power receiver of claim 1, further comprising a DC-DC converter coupled between the battery and the first switching circuit, the DC-DC converter being configured to generate the output from the battery at the first frequency.

5. The wireless power receiver of claim 1, wherein the second switching circuit is coupled to a wired power connection.

6. The wireless power receiver of claim 1, wherein the first switching circuit comprises a half-bridge inverter and the second switching circuit comprises a rectifier.

7. The wireless power receiver of claim 1, wherein the first switching circuit comprises a plurality of transistors forming a symmetrical bridge.

8. The wireless power receiver of claim 7, further comprising a controller configured to operate the plurality of transistors based on one or more control signals having modulated duty cycles to generate the envelope and the output from the battery at the first frequency.

9. The wireless power receiver of claim 1, further comprising a controller configured to control the first switching circuit to generate the first signal and the second switching circuit to generate the second signal.

10. The wireless power receiver of claim 1, wherein the first frequency corresponds to twice a frequency of a mains AC power grid.

11. The wireless power receiver of claim 1, wherein the resonant circuit comprises a capacitor coupled in parallel with the power transfer receive element, the power transfer receive element comprising an inductor.

12. The wireless power receiver of claim 1, wherein the second switching circuit is coupled across a parallel tuned network of the resonant circuit.

13. The wireless power receiver of claim 1, further comprising a bi-directional switch mode controller coupled between the battery and the first switching circuit via at least one inductor, the first switching circuit comprising a half-bridge inverter, the bi-directional switch mode controller comprising two switches coupled in series with the at least one inductor and two additional switches coupled in parallel with the half-bridge inverter.

14. A controller for a wireless power receiver comprising a resonant circuit, the controller being configured to:
control one or more switches of a first switching circuit coupled to the resonant circuit to act as an inverter and generate a first signal, based on an output from a battery in a discharging mode, at a resonant frequency of the resonant circuit, the first signal having an envelope at a first frequency; and control one or more switches of a second switching circuit coupled to the resonant circuit, between the first switching circuit and a power transfer receive element of the resonant circuit, to perform rectification and extract the envelope to generate a second signal at half of the first frequency during the discharging mode of the battery, wherein the resonant circuit biases the second switching circuit at the resonant frequency in response to the first signal.

15. The controller of claim 14, wherein the controller is further configured to control the first switching circuit to perform rectification to convert wireless power received at the resonant circuit from AC to DC for charging the battery.

16. The controller of claim 14, wherein the controller is further configured to control one or more switches of a DC-DC converter coupled between the battery and the first switching circuit to generate the output from the battery at the first frequency.

17. The controller of claim 14, wherein the controller is further configured to modulate a duty cycle of a plurality of transistors of the first switching circuit to generate the envelope and the output from the battery at the first frequency.

18. The controller of claim 14, wherein the first frequency corresponds to twice a frequency of a mains AC power grid.

19. A wireless power receiver apparatus, the apparatus comprising:

a resonant circuit comprising a wireless power transfer element electrically coupled to one or more capacitors;

a first power conversion circuit electrically coupled between the resonant circuit and a battery, the first power conversion circuit comprising one or more first switches; and a second power conversion circuit directly coupled to a node in between the resonant circuit and the first power conversion circuit, the second power conversion circuit comprising one or more second switches and configured to provide an AC output during a discharging mode of the battery.

20. The apparatus of claim 19, wherein the wireless power transfer element comprises an inductor coupled in parallel with at least one of the one or more capacitors.

21. The apparatus of claim 19, wherein the first power conversion circuit is configured to generate a first signal, based on an output from the battery, the first signal having an envelope that is a scaled integer frequency of a first frequency, and wherein the second power conversion circuit is configured to extract and scale the envelope to generate a second signal at the first frequency.

22. The apparatus of claim 21, wherein the first frequency comprises a frequency of a mains AC power grid.

23. The apparatus of claim 19, further comprising a DC-DC converter coupled between the battery and the first power conversion circuit.

24. The apparatus of claim 19, wherein the first power conversion circuit comprises a plurality of switches coupled in series, the plurality of switches being coupled in parallel with the wireless power transfer element.

25. The apparatus of claim 19, wherein the resonant circuit is configured to bias the second power conversion circuit at a resonant frequency of the resonant circuit.

26. A method for converting DC power to AC power by a wireless power receiver comprising a resonant circuit, the method comprising:

controlling one or more switches of a first switching circuit coupled to the resonant circuit to act as an inverter and generate a first signal, based on an output from a battery in a discharging mode, at a resonant frequency of the resonant circuit, the first signal having an envelope at a first frequency; and controlling one or more switches of a second switching circuit coupled to the resonant circuit, between the first switching circuit and a power transfer receive element of the resonant circuit, to perform rectification and extract the envelope to generate a second signal at half of the first frequency during the discharging mode of the battery, wherein the resonant circuit biases the second switching circuit at the resonant frequency in response to the first signal.

27. The method of claim 26, further comprising biasing the first switching circuit at the resonant frequency to perform rectification to convert wireless power received at the resonant circuit from AC to DC for charging the battery.

28. The method of claim 26, further comprising controlling one or more switches of a DC-DC converter coupled between the battery and the first switching circuit to generate the output from the battery at the first frequency.

29. The method of claim 26, further comprising modulating a duty cycle of a plurality of transistors of the first switching circuit to generate the envelope and the output from the battery at the first frequency.

30. The method of claim 26, wherein the first frequency corresponds to twice a frequency of a mains AC power grid.

* * * * *